(12) United States Patent
Matsui et al.

(10) Patent No.: US 12,308,175 B2
(45) Date of Patent: May 20, 2025

(54) MULTILAYER CERAMIC CAPACITOR

(71) Applicant: Murata Manufacturing Co., Ltd., Nagaokakyo (JP)

(72) Inventors: Togo Matsui, Nagaokakyo (JP); Yukito Nishimura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 167 days.

(21) Appl. No.: 17/479,051

(22) Filed: Sep. 20, 2021

(65) Prior Publication Data

US 2022/0093340 A1 Mar. 24, 2022

(30) Foreign Application Priority Data

Sep. 24, 2020 (JP) ................. 2020-160018

(51) Int. Cl.
*H01G 4/30* (2006.01)
*H01G 4/008* (2006.01)
*H01G 4/012* (2006.01)
*H01G 4/12* (2006.01)

(52) U.S. Cl.
CPC .............. *H01G 4/30* (2013.01); *H01G 4/008* (2013.01); *H01G 4/012* (2013.01); *H01G 4/1218* (2013.01)

(58) Field of Classification Search
CPC ........ H01G 4/30; H01G 4/012; H01G 4/1227; H01G 4/2325; H01G 4/008; H01G 4/0085; H01G 4/12; H01G 4/224; H01G 4/228; H01G 4/1218
See application file for complete search history.

(56) References Cited

U.S. PATENT DOCUMENTS

| 2004/0190221 A1* | 9/2004 | Yamaguchi | H01G 4/30 361/306.3 |
| 2006/0245141 A1 | 11/2006 | Shirasu et al. | |
| 2010/0008017 A1* | 1/2010 | Ito | H01G 4/30 361/301.4 |

(Continued)

FOREIGN PATENT DOCUMENTS

| JP | 2002-353068 A | 12/2002 |
| JP | 2004228468 A | 8/2004 |

(Continued)

OTHER PUBLICATIONS

Office Action in JP2020-160018, dated Apr. 4, 2023, 2 pages.
Office Action in JP2020-160018, mailed Sep. 5, 2023, 2 pages.

*Primary Examiner* — Michael P McFadden
(74) *Attorney, Agent, or Firm* — Keating & Bennett, LLP

(57) ABSTRACT

A multilayer ceramic capacitor includes a multilayer body including dielectric layers and internal electrodes alternately laminated therein, and external electrodes respectively on a first end surface and a second end surface of the multilayer body in a length direction intersecting a lamination direction. The internal electrodes each include an opposing portion, a thick portion extending from the opposing portion to one of the first end surface or the second end surface and coupled to one of the external electrodes, and is thicker than the opposing portion in the lamination direction, and a thin portion extending from the opposing portion to another of the first end surface or the second end surface and uncoupled with the external electrodes, and is thinner than the opposing portion in the lamination direction.

18 Claims, 10 Drawing Sheets

(56) References Cited

U.S. PATENT DOCUMENTS

| | | | | |
|---|---|---|---|---|
| 2014/0240895 | A1* | 8/2014 | Lee | H01G 4/12 |
| | | | | 29/25.42 |
| 2015/0016014 | A1* | 1/2015 | Park | H01G 2/065 |
| | | | | 156/89.12 |
| 2015/0340156 | A1* | 11/2015 | Masunari | H01G 4/1227 |
| | | | | 361/301.4 |
| 2016/0196917 | A1* | 7/2016 | Lim | H01G 4/012 |
| | | | | 361/301.4 |
| 2017/0125167 | A1* | 5/2017 | Kawakami | H01G 4/236 |
| 2018/0061577 | A1* | 3/2018 | Yasuda | H01G 4/0085 |
| 2018/0301281 | A1* | 10/2018 | Park | H01G 4/012 |
| 2019/0131074 | A1* | 5/2019 | Mizuno | H01G 4/0085 |
| 2020/0075258 | A1* | 3/2020 | Park | H01G 4/232 |

FOREIGN PATENT DOCUMENTS

| | | | |
|---|---|---|---|
| JP | 2006332601 | A | 12/2006 |
| JP | 2015019032 | A | 1/2015 |
| JP | 2017085044 | A | 5/2017 |
| JP | 2017157754 | A | 9/2017 |

* cited by examiner

MULTILAYER CERAMIC CAPACITOR

CROSS REFERENCE TO RELATED APPLICATIONS

This application claims the benefit of priority to Japanese Patent Application No. 2020-160018 filed on Sep. 24, 2020. The entire contents of this application are hereby incorporated herein by reference.

BACKGROUND OF THE INVENTION

1. Field of the Invention

The present invention relates to a multilayer ceramic capacitor.

2. Description of the Related Art

Recently, a large-capacitance and small multilayer ceramic capacitor has been required. Such a multilayer ceramic capacitor includes a structure in which external electrodes are arranged at both ends of a multilayer body.

The multilayer body includes layered dielectrics and layered internal electrodes laminated (stacked) alternately. The internal electrodes each include an opposing portion facing each other with the adjacent internal electrodes, and a lead-out portion extending from the opposing portion to either one or the other of the external electrodes. The internal electrodes are shorter than the dielectrics in the length direction. Furthermore, the internal electrodes in which the lead-out portions extend from the opposing portions to one end surface, and the internal electrodes in which the lead-out portions extend from the opposing portions to the other end surface, are provided alternately.

With such a structure, the opposing portions of the internal electrodes adjacent to each other are overlapped in the lamination direction, and the lead-out portions overlap every other layer. Therefore, both end portions in the length direction become thinner in the lamination direction as compared with the opposing portions, since the number of laminated internal electrodes is halved.

Therefore, in a manufacturing process, uniform pressure is not applied when pressing the multilayer body from both sides in the lamination direction. Therefore, there is a possibility that good adhesion cannot be obtained at both ends in the length direction.

Furthermore, the multilayer ceramic capacitor may not be a well-formed rectangular parallelepiped. In such a case, it is difficult to attach the multilayer ceramic capacitor to the substrate.

Therefore, a multilayer ceramic capacitor has been developed which has a thickness of the lead-out portions of the internal electrodes at both ends in the length direction which is twice as large as the thickness of the opposing portions (see, for example, Japanese Unexamined Patent Application Publication No. 2002-353068).

However, according to the prior art, there is a problem in that the locations become close in distance between a corner portion of the lead-out portion, which is twice as thick as the opposing portion, of the internal electrode, and at least one of the corner portions of the opposing portions, which are not provided with the lead-out portions, of the internal electrodes that are adjacent to the internal electrode, such that short-circuiting is likely to occur therebetween.

SUMMARY OF THE INVENTION

Preferred embodiments of the present invention provide multilayer ceramic capacitors in each of which short-circuits are less likely to occur between adjacent internal electrodes in a lamination direction.

A preferred embodiment of the present invention provides a multilayer ceramic capacitor that includes a multilayer body including dielectric layers and internal electrodes alternately laminated therein, and external electrodes respectively on a first end surface and a second end surface, which are respectively on both ends of the multilayer body in a length direction intersecting a lamination direction, wherein the internal electrodes each include an opposing portion, a thick portion extending from the opposing portion to one of the first end surface or the second end surface to be coupled to one of the external electrodes, and is thicker than the opposing portion in the lamination direction, and a thin portion extending from the opposing portion to one of the first end surface or the second end surface in an uncoupled state with the external electrodes, and is thinner than the opposing portion in the lamination direction.

According to preferred embodiments of the present invention, it is possible to provide multilayer ceramic capacitors in each of which short-circuits are less likely to occur between adjacent internal electrodes in a lamination direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

Figure 1:
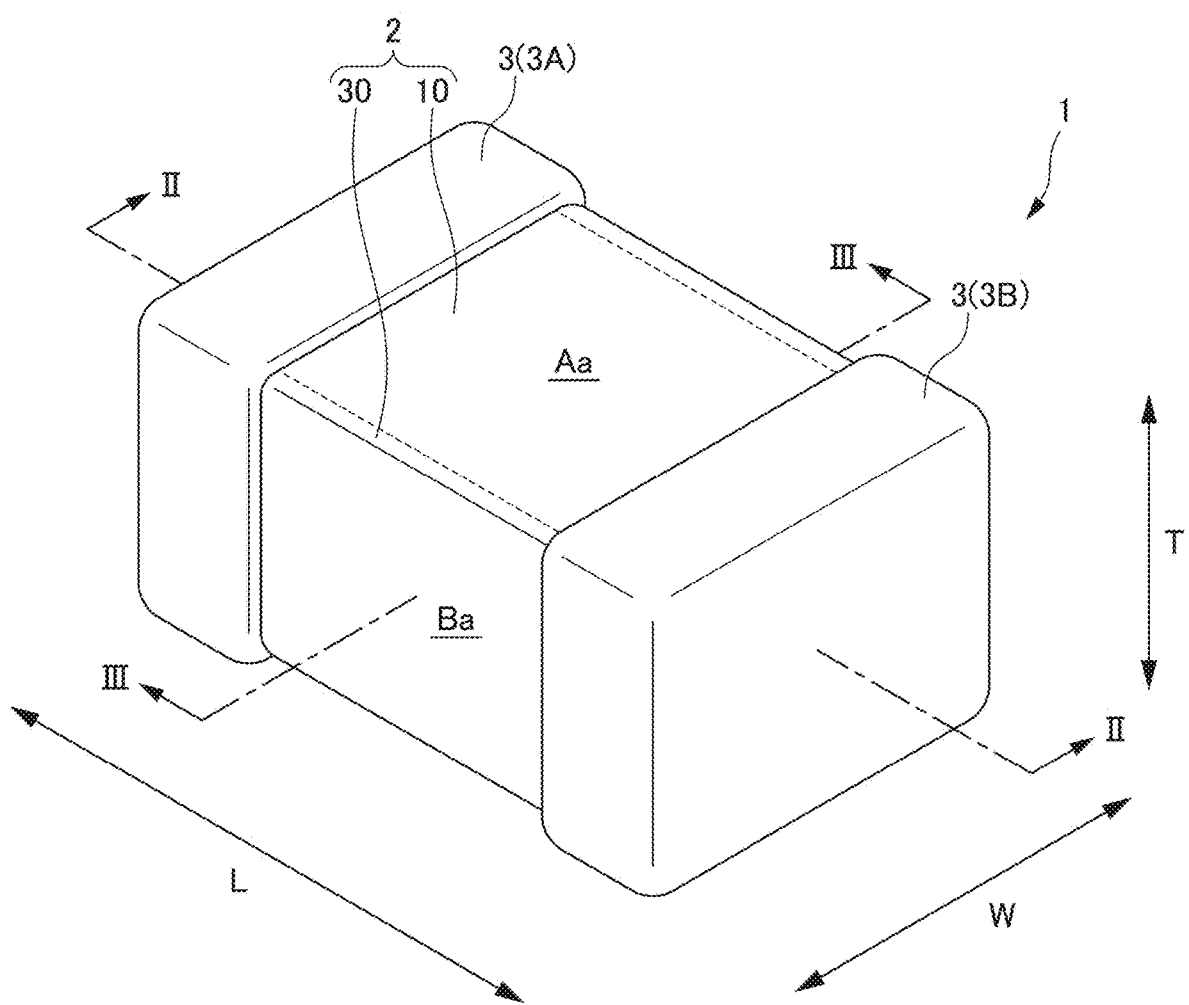
FIG. 1 is a schematic perspective view of a multilayer ceramic capacitor 1 according to a preferred embodiment of the present invention.
Figure 2:
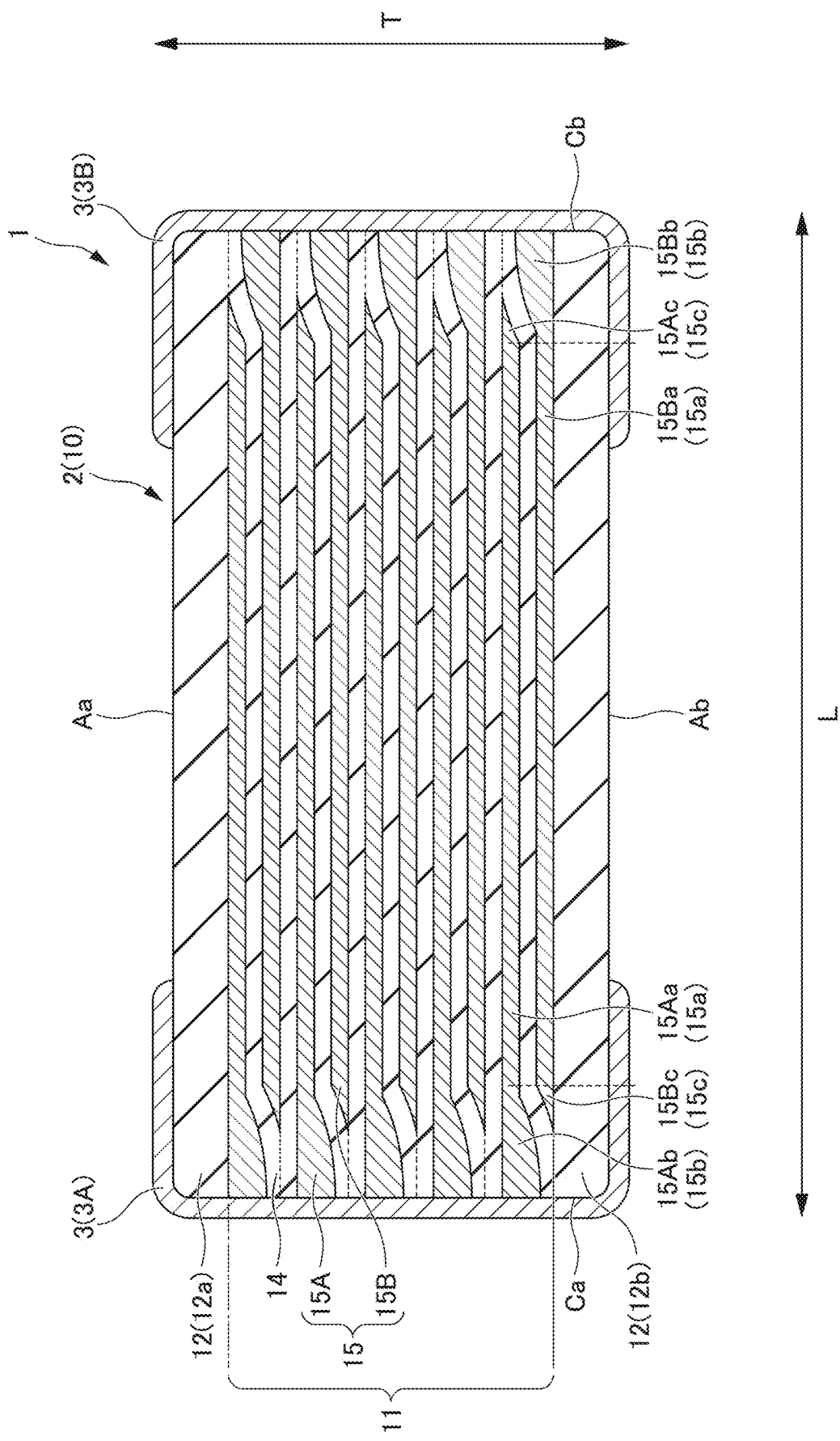
FIG. 2 is a cross-sectional view taken along the line II-II in FIG. 1 of a multilayer ceramic capacitor 1 according to a preferred embodiment of the present invention.
Figure 3:
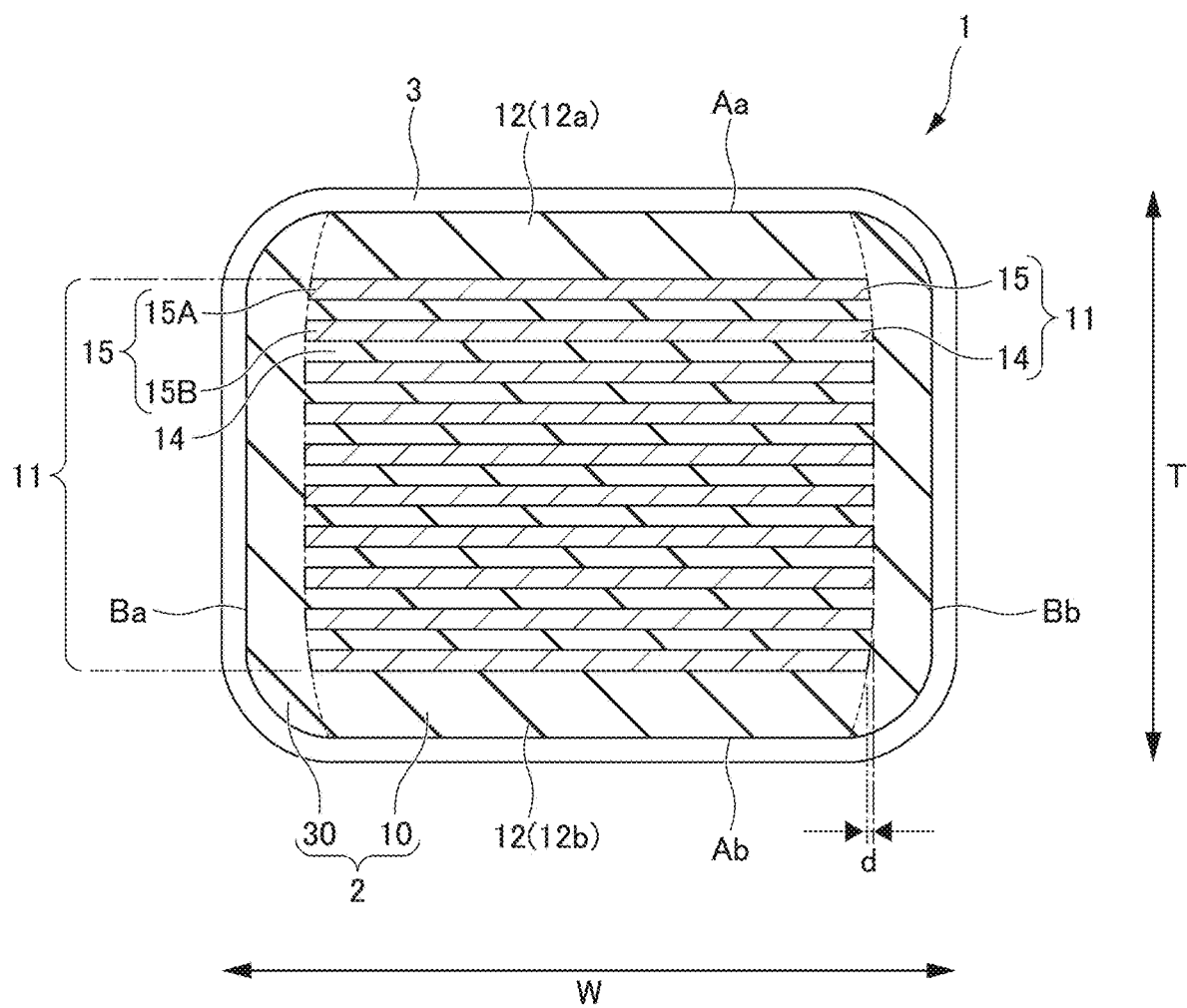
FIG. 3 is a cross-sectional view taken along the line in FIG. 1 of a multilayer ceramic capacitor 1 according to a preferred embodiment of the present invention.

Hereinafter, a multilayer ceramic capacitor 1 according to a preferred embodiment of the present invention will be described. FIG. 1 is a schematic perspective view of a multilayer ceramic capacitor 1 according to a preferred embodiment. FIG. 2 is a cross-sectional view taken along the line II-II in FIG. 1 of the multilayer ceramic capacitor 1 of the present preferred embodiment. FIG. 3 is a cross-sectional view taken along the line III-III in FIG. 1 of the multilayer ceramic capacitor 1 of the present preferred embodiment.

Multilayer Ceramic Capacitor 1

A multilayer ceramic capacitor 1 has a rectangular or substantially rectangular parallelepiped shape, and includes a multilayer body 2, and a pair of external electrodes 3 provided at both ends of the multilayer body 2. The multilayer body 2 includes a laminate chip 10 and a side gap portion 30. The laminate chip 10 includes an inner layer portion 11 and outer layer portions 12. The inner layer portion 11 includes a plurality of sets of a dielectric layer 14 and an internal electrode 15 alternately laminated therein.

In the following description, as terms representing the orientations of the multilayer ceramic capacitor 1, a direction in which the dielectric layers 14 and the internal electrode 15 are laminated (stacked) is defined as a lamination (stacking) direction T. A direction intersecting the lamination direction T in which the pair of external electrodes 3 are provided is defined as a length direction L. A direction intersecting both the length direction L and the lamination direction T is defined as a width direction W. It should be noted that, in the present preferred embodiment, the lamination direction T, the length direction L, and the width direction W are perpendicular or substantially perpendicular to one another.

Furthermore, in the following description, among the six outer surfaces of the multilayer body 2, a pair of outer surfaces opposing in the lamination direction T are referred to as a first main surface Aa and a second main surface Ab, respectively, a pair of outer surfaces opposing in the width direction W are referred to as a first side surface Ba and a second side surface Bb, respectively, and a pair of outer surfaces opposing in the length direction L are referred to as a first end surface Ca and a second end surface Cb.

It should be noted that, when it is not necessary to particularly distinguish between the first main surface Aa and the second main surface Ab, they are collectively referred to as a main surface A, when it is not necessary to particularly distinguish between the first side surface Ba and the second side surface Bb, they are collectively referred to as a main surface B, and when it is not necessary to particularly distinguish between the first end surface Ca and the second end surface Cb, they are collectively referred to as an end surface C.

Multilayer Body 2

As described above, the multilayer body 2 includes the laminate chip 10 and the side gap portion 30. The dimension of the multilayer body 2 is not particularly limited. However, for example, it is preferable that the dimension in the length direction L are about 0.2 mm or more and about 10 mm or less, the dimension in the width direction W are about 0.1 mm or more and about 10 mm or less, and the dimension in the lamination direction T are about 0.1 mm or more and about 5 mm or less.

Laminate Chip 10

The laminate chip 10 includes the inner layer portion 11, an upper outer layer portion 12a adjacent to the first main surface Aa of the inner layer portion 11, and a lower outer layer portion 12b adjacent to the second main surface Ab of the inner layer portion 11.

Inner Layer Portion 11

The inner layer portion 11 includes the plurality of sets of the dielectric 14 and the internal electrode 15 alternately laminated therein along the lamination direction T.

Dielectric 14

The dielectric 14 has a thickness of, for example, about 0.5 μm or less. The dielectric 14 is made of a ceramic material. As the ceramic material, for example, a dielectric ceramic including $BaTiO_3$ as a main component is used. Furthermore, as the ceramic material, those obtained by adding, for example, at least one sub-component such as Mn compounds, Fe compounds, Cr compounds, Co compounds, and Ni compounds to these main components may be used. It should be noted that the number of dielectric layers 14 of the laminate chip 10 in addition to the upper outer layer portion 12a and the lower outer layer portion 12b is preferably 15 or more and 700 or less, for example.

Internal Electrodes 15

The internal electrodes 15 include a plurality of first internal electrodes 15A and a plurality of second internal electrodes 15B. The first internal electrodes 15A and the second internal electrodes 15B are alternately provided. It should be noted that, when it is not necessary to distinguish between the first internal electrode 15a and the second internal electrode 15b, they are collectively referred to as an internal electrode 15.

The internal electrodes 15 are preferably made of, for example, a metallic material such as Ni, Cu, Ag, Pd, Ag—Pd alloy, Au, or the like. The number of internal electrodes 15 in addition to the first internal electrode 15A and the second internal electrode 15B is preferably 15 or more and 200 or less, for example.

The internal electrodes 15 include opposing portions 15a, thick portions 15b, and thin portions 15c. The thick portions 15b each extend to one of the end surfaces C from the opposing portion 15a to be coupled to one of the external electrodes 3. The thick portion 15b is thicker than the opposing portion 15a. The thin portions 15c each extend to the other one of the end surfaces C from the opposing portion 15a, but are not coupled to the other one of the external electrodes 3. The thin portion 15c is thinner than the opposing portion 15a. The dimensions in the length direction L of the thin portion 15c and the thick portion 15b is about 5 μm to about 30 μm, for example.

Opposing Portions 15a

The opposing portions 15a each have a plate shape with a constant or substantially constant thickness, and the thickness is preferably, for example, about 0.5 μm or more and about 2.0 mm or less. The opposing portions 15a in the cross section shown in FIG. 2 are each shown in an elongated rectangular or substantially rectangular shape.

Thick Portions 15b

The thick portions 15b each extend to one of the end surface C from the opposing portion 15a to be coupled to one of the external electrodes 3. The thick portion 15b becomes gradually thicker toward the end surface C. The maximum thickness of the thick portion 15b is, for example, about twice the opposing portion 15a.

In the present preferred embodiment, as shown in FIG. 2, one surface of the thick portion 15b in the lamination direction T is flush with the opposing portion 15a.

The other surface of the thick portion 15b in the lamination direction T protrudes in the lamination direction T with respect to the opposing portion 15a, and the thickness of the thick portion 15b becomes gradually thicker toward the end surface C. In the cross section shown in FIG. 2, the profile of the protruding portion of the thick portion 15b is a curve which is curved to follow or substantially follow the circumference of an ellipse.

Thin Portion 15c

The thin portions 15c each extend from the opposing portion 15a to the other end surface C, and gradually become thinner toward the end surface C. The thin portion 15c does not extend to the end surface C.

As shown in FIG. 2, one surface of the thin portion 15c in the lamination direction T is flush with the opposing portion 15a. In the present preferred embodiment, the one surface of the thin portion 15c which is flush with the opposing portion 15a is located on the same side on which the one surface of the thick portion 15b which is flush with the opposing portion 15a is located.

The other surface of the thin portion 15c in the lamination direction T becomes recessed in the lamination direction T with respect to the opposing portion 15a, and the thickness of the thin portion 15c becomes gradually thinner toward the end surface C. The profile of the recessed portion of the thin portion 15c in the cross section shown in FIG. 2 is a curve which is curved to follow or substantially follow the circumference of an ellipse. In the present preferred embodiment, the other surface recessed with respect to the opposing portion 15a in the thin portion 15c is located on the same side on which the other surface protruding with respect to the opposing portion 15a in the thick portion 15b is located.

That is, in the present preferred embodiment, the direction in which the thick portion 15b protrudes is opposite to the direction in which the thin portion 15c is recessed.

Specifically, the first internal electrode 15A includes a first opposing portion 15Aa, a first thick portion 15Ab, and a first thin portion 15Ac. The first thick portion 15Ab extends from the first opposing portion 15Aa to the first end surface Ca to be coupled to the first external electrode 3A. The first thick portion 15Ab becomes gradually thicker toward the first end surface Ca. The first thin portion 15Ac extends from the first opposing portion 15Aa toward the second end surface Cb.

The second internal electrode 15B includes a second opposing portion 15Ba, a second thick portion 15Bb, and a second thin portion 15Bc. The second thick portion 15Bb extends from the second opposing portion 15Ba to the second end surface Cb to be coupled to the second external electrode 3B. The second thick portion 15Bb becomes gradually thicker toward the second end surface Cb. The second thin portion 15Bc extends from the second opposing portion 15Ba toward the second end surface Cb.

Although the shapes of the first internal electrode 15A and the second internal electrode 15B are the same or substantially the same, the orientations thereof in the lamination direction T are reversed in the present preferred embodiment.

That is, as shown in FIG. 2, in the first internal electrode 15A, the first thick portion 15Ab protrudes toward the second main surface Ab, and the first thin portion 15Ac is recessed toward the first main surface Aa.

In the second internal electrode 15B, the second thick portion 15Bb protrudes toward the first main surface Aa, and the second thin portion 15Bc is recessed toward the second main surface Ab.

The first opposing portion 15Aa of the first internal electrode 15A and the second opposing portion 15Ba of the second internal electrode 15B are opposed to each other, and a charge is accumulated therebetween, thus providing the characteristics of the capacitor.

The first thin portion 15Ac of the first internal electrode 15A and the second thick portion 15Bb of the second internal electrode 15B are located at the same or substantially the same position in the length direction L and opposed to each other, and thus overlap in the lamination direction T.

Furthermore, the curve of the first thin portion 15Ac and the curve of the second thick portion 15Bb are the same or substantially the same. Therefore, the space is constant or substantially constant between the first thin portion 15Ac and the second thick portion 15Bb that are opposed to each other in the lamination direction T.

Similarly, the second thin portion 15Bc of the second internal electrode 15B and the first thick portion 15Ab of the first internal electrode 15A are located at the same or substantially the same position in the length direction L and opposed to each other, and overlap in the lamination direction T.

Furthermore, the curve of the second thin portion 15Bc and the curve of the first thick portion 15Ab are the same or substantially the same. Therefore, the space is constant or substantially constant between the second thin portion 15Bc the first thick portion 15Ab that are opposed to each other in the lamination direction T.

According to the present preferred embodiment, the maximum thickness of the thick portion 15b is about twice the opposing portion 15a. Thereafter, the curve of the thick portion 15b and the curve of the thin portion 15c are the same or substantially the same. Therefore, as the thick portion 15b becomes thicker, the thin portion 15c becomes thinner.

That is, the total thickness of the thin portion 15c and the thick portion 15b at the same location at both ends of the length direction L is constant or substantially constant, and is about twice the opposing portion 15a.

Therefore, the total thickness of the adjacent internal electrodes 15 is always constant or substantially constant.

Furthermore, in the present preferred embodiment, the total thickness of the lamination direction T of the dielectric 14 is constant or substantially constant in the length direction L. Therefore, the thickness of the lamination direction T as the laminate chip 10 (the multilayer body 2) is constant or substantially constant.

Furthermore, as shown in FIG. 3, in the WT cross section which is a cross section of the width direction W and the lamination direction T and passes through the center of the multilayer body 2, the deviation d in the lamination direction T between the ends in the width direction W of the first internal electrode 15A and the second internal electrode 15B adjacent in the lamination direction T is about 0.5 μm or less, for example. That is, the ends in the width direction W of the first internal electrode 15A and the second internal electrode 15B adjacent in the lamination direction T are at or substantially at the same position in the width direction W, and the positions of the ends are aligned in the lamination direction T.

Outer Layer Portion 12

The outer layer portions 12 are each made of the same material as the dielectric 14 of the inner layer portion 11. Furthermore, each of the thicknesses of the outer layer portions 12 is, for example, about 20 μm or less, and more preferably about 10 μm or less.

Side Gap Portion 30

The side gap portion 30 is provided at the end in the width direction W of the internal electrodes 15 exposed on both sides of the laminate chip 10. The side gap portion 30 is made of the same material as the dielectric 14. The thickness of the side gap portion 30 is, for example, about 20 μm, and preferably about 10 μm or less.

External Electrodes 3

The external electrode 3 covers not only the end surface C, but also portions that are adjacent to the end surface C of the main surface A and the side surface B.

As described above, the end portion of the first thick portion 15Ab of the first internal electrode 15A is exposed to the first end surface Ca, and is electrically connected to the first external electrode 3A. The end of the second thick portion 15Bb of the second internal electrode 15B is exposed to the second end surface Cb, and is electrically connected to the second external electrode 3B. Thus, a plurality of capacitor elements are electrically connected in parallel between the first external electrode 3A and the second external electrode 3B.

Method of Manufacturing Multilayer Ceramic Capacitor 1

Figure 4:
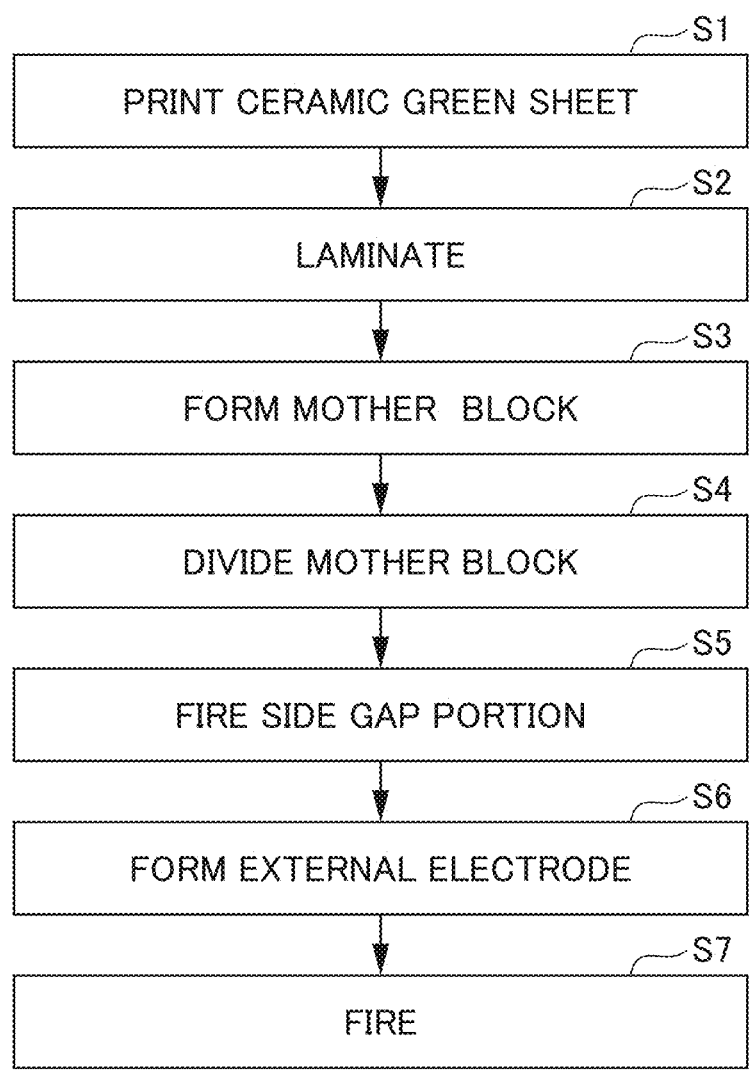
FIG. 4 is a flowchart showing a method of manufacturing the multilayer ceramic capacitor 1 according to a preferred embodiment of the present invention.

Next, an example of a method of manufacturing the multilayer ceramic capacitor 1 of the present preferred embodiment will be described. FIG. 4 is a flowchart showing a method of manufacturing the multilayer ceramic capacitor 1.

Ceramic Green Sheet Printing Process S1

Figure 5:
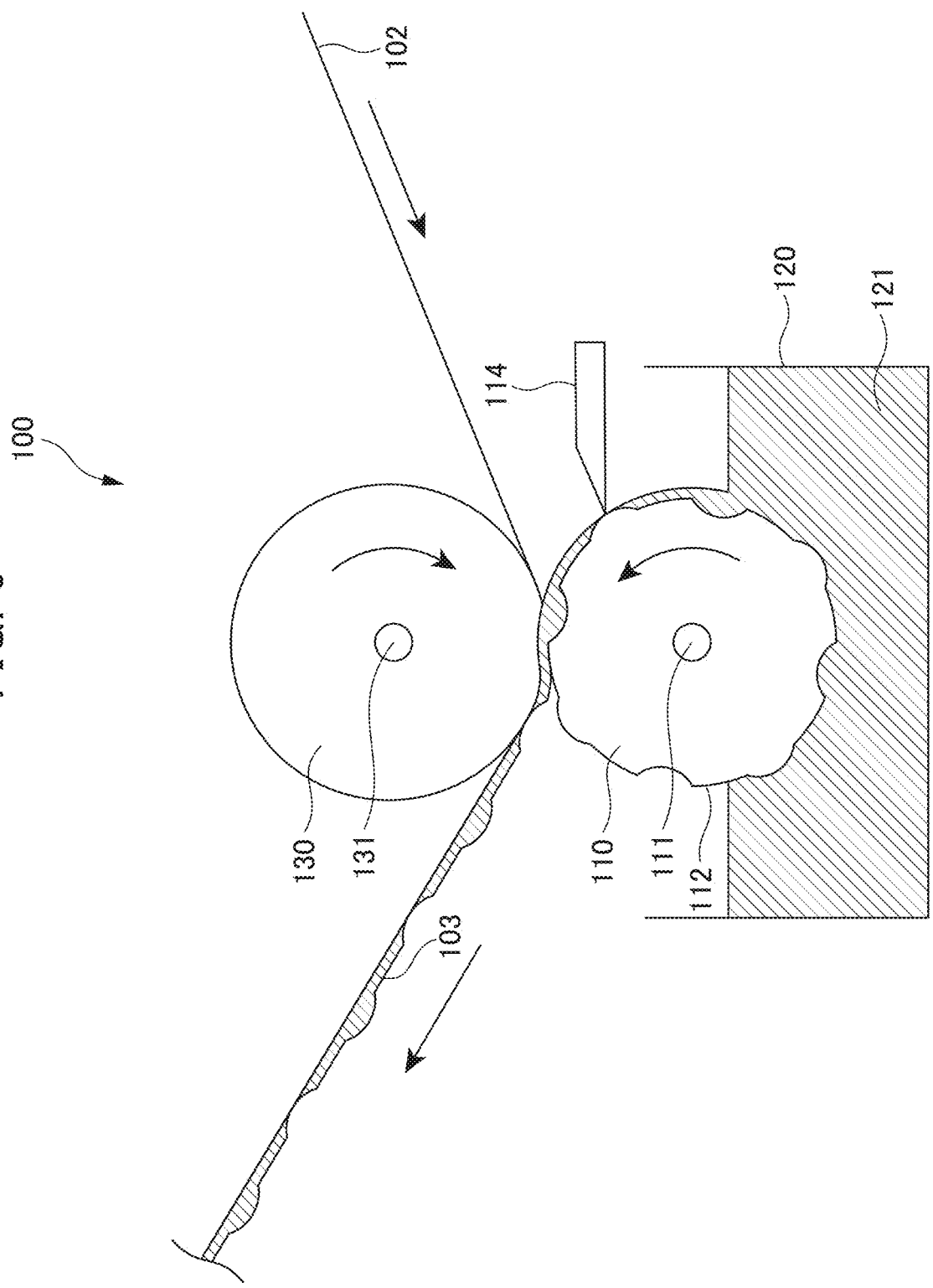
FIG. 5 is a printing apparatus 100 for use in manufacturing the multilayer ceramic capacitor 1.

First, an internal electrode pattern 103 defining and functioning as the internal electrode 15 is printed on a ceramic green sheet 102 using a printing apparatus 100. FIG. 5 is the printing apparatus 100 use to manufacture the multilayer ceramic capacitor 1, and the apparatus prints the internal electrode pattern 103 defining and functioning as the internal electrode 15 on the ceramic green sheet 102.

The printing apparatus 100 includes a cylindrical plate cylinder 110 on which recess portions 112 of the shape of the internal electrode pattern 103 are provided, a paste supply unit 120 in which a conductive paste 121 for electrodes is stored as a paste, and an impression cylinder 130 to sandwich the ceramic green sheet 102 between the plate cylinder 110 and the impression cylinder 130.

Ceramic Green Sheet 102

The ceramic green sheet 102 is a strip-shaped sheet produced by a ceramic slurry including a ceramic powder, a binder, and a solvent being formed in a sheet shape on a carrier film using a die coater, gravure coater, a microgravure coater, or the like, for example.

Plate Cylinder 110

The plate cylinder 110 is a cylindrical or columnar member which is rotatable about a plate cylinder shaft 111 extending horizontally or substantially horizontally. The plate cylinder 110 includes the plurality of recess portions 112 thereon, which correspond to the shape of the internal electrode pattern 103 to be printed on the ceramic green sheet 102 on the outer peripheral surface thereof.

In the present preferred embodiment, the recess portions 112 have a shape corresponding to a combined shape of the two internal electrodes 15. That is, it is a shape obtained by coupling the two internal electrodes 15 to each other at the thick portions 15*b*, in which two flat recess portions each corresponding to the opposing portion 15*a* are provided in line, a portion between the two flat recess portions is further recessed in accordance with the shape provided by combining the two thick portions 15*b*, and both ends of the flat recess portions each corresponding to the opposing portion 15*a* become gradually shallower similarly to the shape of the thin portion 15*c*.

Such recess portions 112 are formed by, for example, etching or engraving or the like using a photomask original plate. The plurality of recess portions 112 have the same or substantially the same shape with each other, and are aligned at regular intervals in the axial direction and the circumferential direction of the plate cylinder 110. Hereinafter, the direction in which the plate cylinder shaft 111 extends is referred to as an axial direction.

Paste Supply Unit 120

The paste supply unit 120 is a reservoir for a conductive paste provided under the plate cylinder 110.

The conductive paste 121 is stored in the paste supply unit 120, and the lower portion of the plate cylinder 110 is immersed in the conductive paste 121.

Thus, the conductive paste 121 enters the recess portions 112 on the outer peripheral surface of the plate cylinder 110.

Blade 114

A blade 114 is provided on a side portion of the plate cylinder 110. The conductive paste 121 stored in the paste supply unit 120 is introduced into the recess portions 112 of the plate cylinder 110, and the conductive paste 121 is transported to the contact portion with the ceramic green sheet 102. Along the way, the blade 114 is pressed against the surface of the plate cylinder 110. This blade 114 scrapes off the conductive paste 121 adhering to a portion other than the recess portions 112 on the surface of the plate cylinder 110.

Impression Cylinder 130

The impression cylinder 130 is a cylindrical or columnar member which is provided on the plate cylinder 110, and rotates about an impression cylinder shaft 131 which is parallel or substantially parallel with the plate cylinder shaft 111. The outer peripheral surface of the impression cylinder 130 is covered with an elastic member.

The impression cylinder 130 sandwiches the ceramic green sheet 102 between the plate cylinder 110 and the impression cylinder 130, and presses the ceramic green sheet 102 against the plate cylinder 110.

The ceramic green sheet 102 is sandwiched between the impression cylinder 130 and the plate cylinder 110, and the plate cylinder 110 and the impression cylinder 130 rotate, such that the ceramic green sheet 102 is conveyed.

At this time, the conductive paste 121 stored in the paste supply unit 120 enters the recess portions 112 of the plate cylinder 110, and is transported to the contact portion with the ceramic green sheet 102.

The ceramic green sheet 102 is pressed against the outer peripheral surface of the plate cylinder 110 by the impression cylinder 130, and the conductive paste 121 filled in the recess portions 112 of the plate cylinder 110 is transferred to the ceramic green sheet 102 within a range defined by the nip width, such that the internal electrode pattern 103 is formed on the ceramic green sheet 102.

Thus, a material sheet 203 is provided in which the internal electrode pattern 103 serving as the internal electrode 15 is printed on the surface of the multilayer ceramic green sheet 101 defining and functioning as a dielectric 14.

Laminating Step S2

Figure 6:
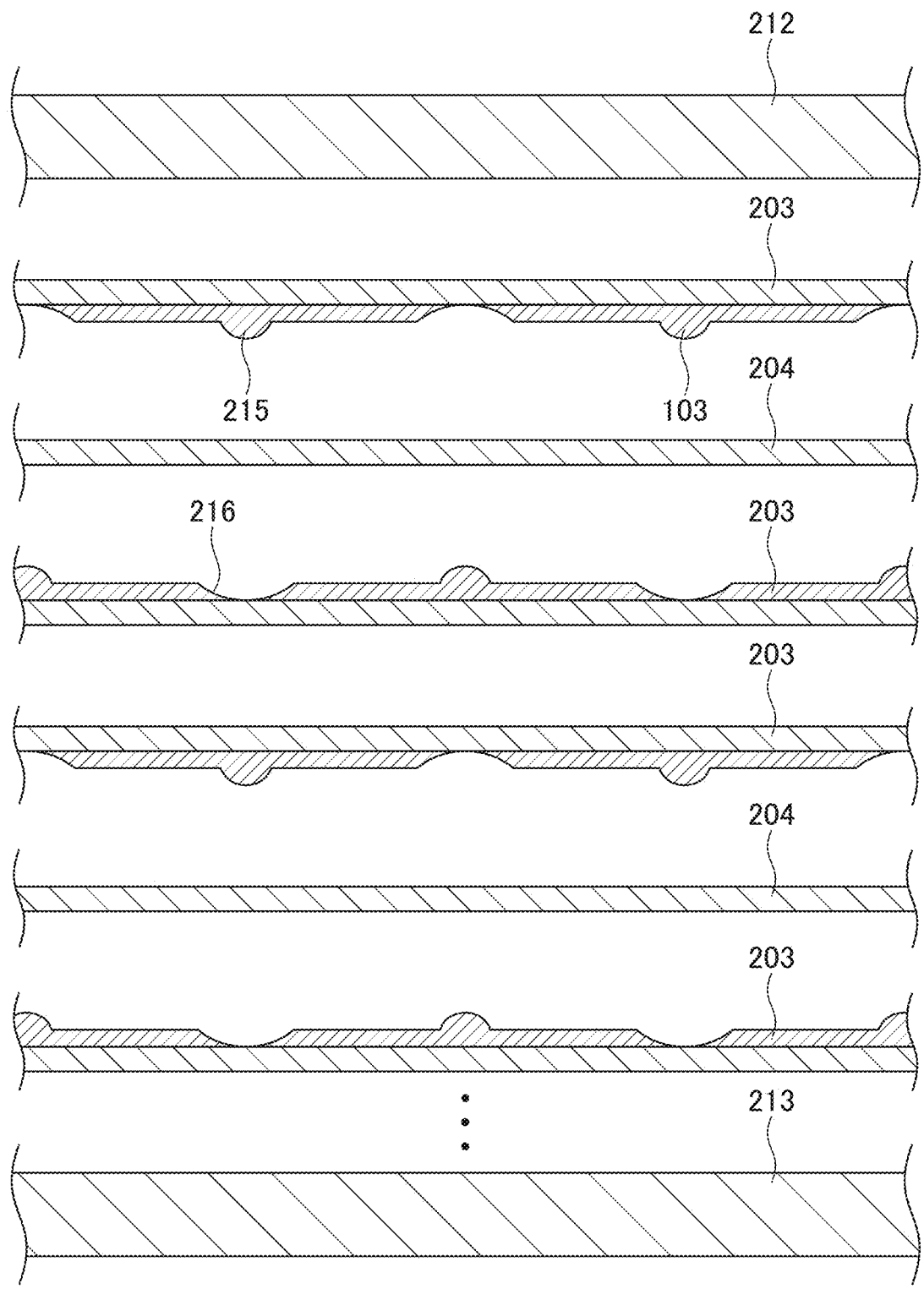
FIG. 6 is a schematic diagram showing a laminated state of a material sheet 203.

FIG. 6 is a schematic diagram showing a laminated state of the material sheet 203. As shown, two material sheets 203 facing each other sandwich a ceramic green sheet 204, and a plurality of sets including these sheets are provided.

The plurality of sets of material sheets 203 are stacked such that, for two material sheets 203 having orientations opposing each other, the internal electrode patterns 103 face each other, and the internal electrode patterns 103 facing each other are shifted by about a half pitch in the width direction from the internal electrode patterns 103 of the adjacent material sheets 203. That is, a protrusion 215 provided by combining two thick portions 15*b* on one of the two material sheets 203 facing each other is opposed to a recess portion 216 provided between the thin portion 15c and the thin portion 15c on the other one of the two material sheets 203 facing each other.

Furthermore, an upper outer layer portion ceramic green sheet 212 defining and functioning as the upper outer layer portion 12a is stacked on one side of the plurality of stacked material sheets 203, and a lower outer layer portion ceramic green sheet 213 defining and functioning as the lower outer layer portion 12b is stacked on the other side of the plurality of stacked material sheets 203.

Mother Block Forming Step S3

Subsequently, the upper outer layer portion ceramic green sheet 212, a plurality of sets of stacked material sheets 203 and the ceramic green sheets 204, and the lower outer layer portion ceramic green sheet 213 are subjected to thermocompression bonding.

Figure 7:
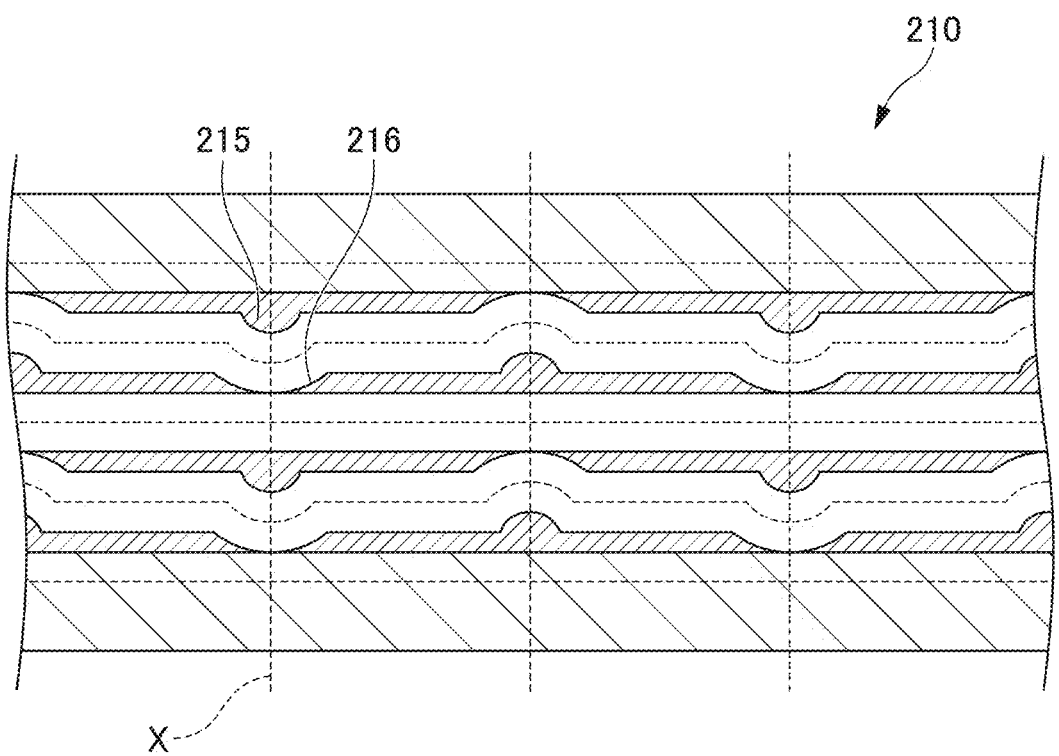
FIG. 7 shows a mother block 210.

As a result, the mother block 210 shown in FIG. 7 is formed.

Mother Block Dividing Step S4

Next, the mother block 210 is divided along the cutting line X corresponding to the dimension of the laminate chip 10.

Thus, a plurality of multilayer chips 10 of the multilayer ceramic capacitor 1 are manufactured.

Side Gap Portion Firing Step S5

Next, a ceramic slurry in which Mg is added as a sintering aid to the same dielectric powder as that of the multilayer ceramic green sheet 101 is produced. Then, the ceramic slurry is applied on a resin film, and dried to produce a ceramic green sheet providing a side gap portion.

Then, the ceramic green sheet for the side gap portion is affixed on the side portion at which the internal electrode 15 of the laminate chip 10 is exposed to form a layer defining and functioning as the side gap portion 30. At this time, the ceramic green sheet for the side gap is pressed against the side portion at which the internal electrode 15 of the laminate chip 10 is exposed.

The layer defining and functioning as the side gap portion 30 is formed in the laminate chip 10, and the resultant body is subjected to degreasing treatment in a nitrogen atmosphere under a predetermined condition, and then fired and sintered at a predetermined temperature in a nitrogen-hydrogen-steam mixed atmosphere to form the multilayer body 2.

Here, Mg of the side gap portion 30 during sintering migrates toward the internal electrode 15. Thus, after sintering, Mg of the side gap portion 30 is segregated toward the internal electrode 15. Furthermore, the dielectric 14 and the side gap portion 30 are manufactured with the same or substantially the same material. However, since the side gap portion 30 is affixed to the laminate chip 10 including the dielectric 14, even after sintering, there is an interface between the side gap portion 30 and the laminate chip 10.

External Electrode Forming Step S6

Next, the external electrodes 3 are formed at both ends of the multilayer body 2, respectively.

Firing Step S7

Then, the resultant body is heated for a predetermined time in a nitrogen atmosphere at a set firing temperature.

As a result, the external electrodes 3 are burned onto the multilayer body 2 to manufacture the multilayer ceramic capacitor 1 shown in FIG. 1.

As described above, according to the present preferred embodiment, the multilayer ceramic capacitor includes the multilayer body 2 including the dielectric layers 14 and the internal electrodes 15 alternately laminated therein, and the external electrodes 3 respectively on both sides of the end surfaces C of the multilayer body 2 in the length direction L intersecting the lamination direction T. The internal electrodes 15 each include the opposing portion 15a, the thick portion 15b that extends from the opposing portion 15a to the end surface C and coupled to one of the external electrodes 3, and is thicker than the opposing portion 15a, and the thin portion 15c that extends from the opposing portion 15a toward the end surface C but not coupled to the external electrodes 3, and is thinner than the opposing portion 15a in the lamination direction. The internal electrodes in which the thick portions 15b extend to one of the end surfaces C and the internal electrodes 15 in which the thick portions 15b extend to the other one of the end surfaces C are alternately provided.

Furthermore, in the internal electrodes 15 facing each other, the thin portion 15c of one of the internal electrodes 15 and the thick portion 15b of the other one of the internal electrodes 15 are opposed to each other in the lamination direction T.

According to the present preferred embodiment, since the portions where the internal electrodes 15 defining and functioning as the lead-out portions overlap every other layer correspond to the thick portion 15b, the thickness in the lamination direction T is not significantly reduced.

Therefore, variations do not occur in the thickness, and thus, it is possible to apply an equal or substantially equal pressure when pressing from both sides in the lamination direction T in the manufacturing process, such that it is possible to obtain good adhesion at the both ends in the length direction L. Furthermore, the multilayer ceramic capacitor 1 becomes a well-formed rectangular parallelepiped, which is easily attached to the board.

Figure 8:
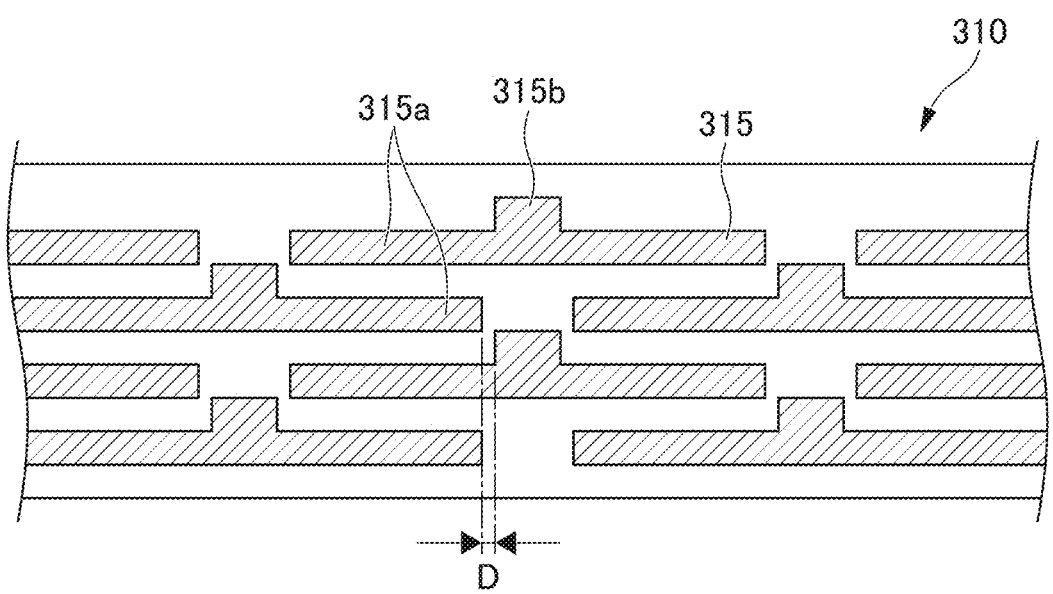
FIG. 8 is a diagram showing a mother block 310 in a comparative example.

FIG. 8 is a diagram showing a mother block 310 in a comparative example. In the comparative example as well, portions where internal electrodes 315 defining and functioning as the lead-out portions overlap every other layer correspond to the thick portion 315b. Therefore, it is possible to make the thickness in the lamination direction T as the laminate chip (the multilayer body) constant or substantially constant.

However, in the comparative example, the thin portion is not provided. Then, the thickness of the thick portion 315b is constant or substantially constant, and increases abruptly with respect to the opposing portion 315a. Therefore, the distance D between the corner portion of the thick portion 315b and the end portion of the opposing portion 315a of the adjacent internal electrode 315 is short as illustrated. Therefore, short-circuits are likely to occur between the adjacent internal electrodes 315.

However, in the present preferred embodiment, since the curve of the thick portion 15b and the curve of the thin portion 15c are the same or substantially the same, and the dielectric 14 provided therebetween has a constant or substantially constant thickness, it is less likely that the distance between the thick portion 15b and the thin portion 15c is reduced, and thus, short-circuits are unlikely to occur.

While preferred embodiments of the present invention have been described above, the present invention is not limited thereto, and various modifications as described below, for example, are possible.

In the present preferred embodiment, there is no electrode between the thin portion 15c and the end surface C to which the thin portion 15C extends. However, the present invention is not limited thereto, and there may be floating electrodes which are not coupled to the external electrode 3 and are interspersed between the thin portion 15c and the end surface C to which the thin portion 15c extends. The floating electrodes refer to conductors including a portion of the internal electrode pattern in the recess portion 216 of FIG. 6 being separated during firing to become floating islands. The floating electrodes are not electrically connected to the internal electrode or the external electrode.

Figure 9:
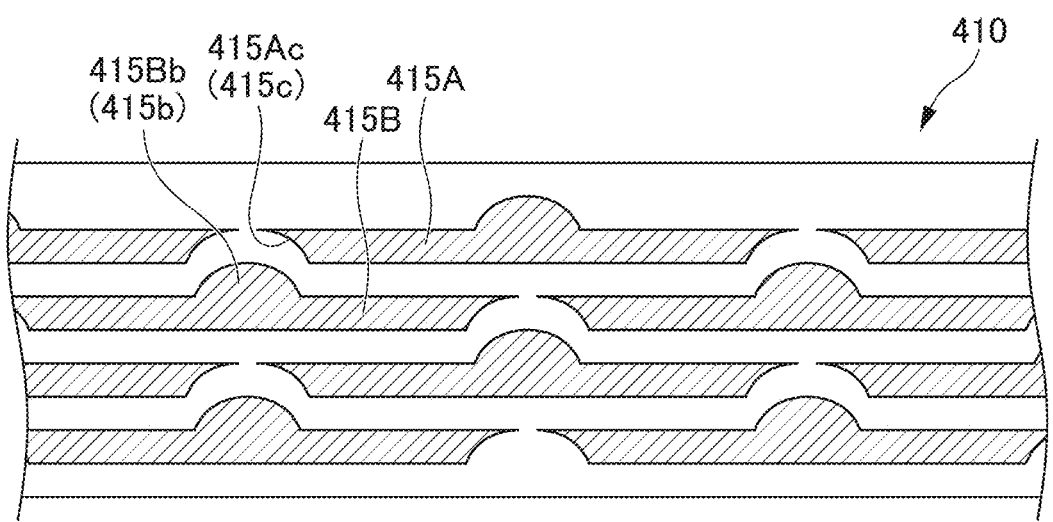
FIG. 9 is a diagram showing a mother block 410 for manufacturing a multilayer ceramic capacitor 1 of a first modified example according to a preferred embodiment of the present invention.

FIG. 9 is a diagram showing a mother block 410 for manufacturing a multilayer ceramic capacitor of a first modified example of a preferred embodiment of the present invention.

In the above-described preferred embodiment, the protruding direction of the thick portion 15b differs from the direction in which the thin portion 15c is recessed.

Therefore, the directions in the lamination direction T of the first internal electrode 15A and the second internal electrode 15B are opposite to each other.

However, as illustrated in FIG. 9, when the protruding direction of the thick portion 415b is the same as the recessed direction of the thin portion 415c, it is possible to make the direction in the lamination direction T of the first internal electrode 415A and the second internal electrode 415B the same such that the thick portion 415Bb of the second internal electrode 415B is opposed to the recessed portion of the thin portion 415Ac of the first internal electrode 415A.

A portion of the internal electrode pattern in the thin portion 415Ac of FIG. 9 may be a floating electrode.

Figure 10:
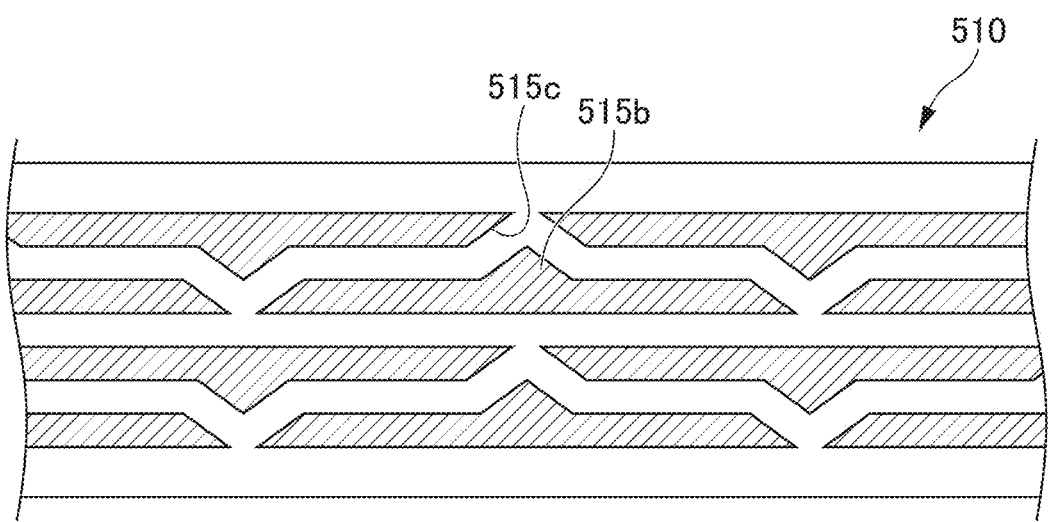
FIG. 10 is a diagram showing a mother block 510 for manufacturing a multilayer ceramic capacitor 1 of a second modified example according to a preferred embodiment of the present invention.

FIG. 10 is a diagram showing a mother block 510 for manufacturing a multilayer ceramic capacitor of a second modified example of a preferred embodiment of the present invention.

In the above-described preferred embodiment, the profile of the thick portion 15b in the lamination direction T is a curve following or substantially following the circumference of an ellipse, and the profile of the thin portion 515c in the lamination direction T is a curve following or substantially following the circumference of an ellipse.

However, the present invention is not limited thereto, and as shown in FIG. 10, the profile of the thick portion 515b in the lamination direction T and the profile of the thin portion 515c in the lamination direction T may be straight lines, for example.

A portion of the internal electrode pattern in the thin portion 515c of FIG. 10 may be a floating electrode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
 a multilayer body including dielectric layers and internal electrodes alternately laminated therein; and
 external electrodes respectively on a first end surface and a second end surface, which are respectively on both ends of the multilayer body in a length direction intersecting a lamination direction; wherein
 each of the internal electrodes includes:
  an opposing portion with a constant or substantially constant thickness;
  a thick portion extending from the opposing portion to one of the first end surface or the second end surface and coupled to one of the external electrodes, and is thicker than the opposing portion in the lamination direction; and
  a thin portion extending from the opposing portion to another of the first end surface or the second end surface and uncoupled with the external electrodes, and is thinner than the opposing portion in the lamination direction;
 in adjacent internal electrodes in the lamination direction, the thin portion of one of the adjacent internal electrodes is opposed to the thick portion of another one of the adjacent internal electrodes;
 an interval in the lamination direction between the thick portion and the thin portion facing each other is constant or substantially constant;
 at least one surface of the thin portion extends parallel or substantially parallel to the length direction; and
 a deviation amount in the lamination direction between ends of the internal electrodes in a width direction intersecting the lamination direction and the length direction is about 0.5 µm or less.

2. The multilayer ceramic capacitor according to claim 1, wherein
 a thickness of the thick portion increases in the lamination direction from the opposing portion toward the one of the first end surface or the second end surface; and
 a thickness of the thin portion decreases in the lamination direction from the opposing portion toward the another of the first end surface or the second end surface.

3. The multilayer ceramic capacitor according to claim 1, wherein dimensions of the thin portion and the thick portion in the length direction are about 5 µm to about 30 µm.

4. The multilayer ceramic capacitor according to claim 1, wherein floating electrodes are interspersed between the thin portion and the another of the first end surface or the second end surface to which the thin portion extends.

5. The multilayer ceramic capacitor according to claim 1, wherein the multilayer body has a rectangular or substantially rectangular shape.

6. The multilayer ceramic capacitor according to claim 1, wherein the multilayer body has a dimension in the length direction of about 0.2 mm or more and about 10 mm or less, a dimension in a width direction of about 0.1 mm or more and about 10 mm or less, and a dimension in the lamination direction of about 0.1 mm or more and about 5 mm or less.

7. The multilayer ceramic capacitor according to claim 1, wherein the multilayer body includes a laminate chip and a side gap portion.

8. The multilayer ceramic capacitor according to claim 7, wherein
 the laminate chip includes an inner layer portion and outer layer portions on each side of the inner layer portion in the lamination direction; and
 the inner layer portion includes the dielectric layers and the internal electrodes.

9. The multilayer ceramic capacitor according to claim 1, wherein each of the dielectric layers has a thickness of about 0.5 µm.

10. The multilayer ceramic capacitor according to claim 1, wherein each of the dielectric layers includes a dielectric ceramic including $BaTiO_3$ as a main component.

11. The multilayer ceramic capacitor according to claim 10, wherein each of the dielectric layers further includes at least one of a Mn compound, a Fe compound, a Cr compound, a Co compound, and a Ni compound as a subcomponent.

12. The multilayer ceramic capacitor according to claim 8, wherein the laminate chip includes 15 or more and 700 or less of the dielectric layers.

13. The multilayer ceramic capacitor according to claim 1, wherein each of the internal electrodes includes at least one of Ni, Cu, Ag, Pd, Ag-Pd alloy, or Au.

14. The multilayer ceramic capacitor according to claim 1, wherein a thickness of the opposing portion is about 0.5 μm or more and about 2.0 mm or less.

15. The multilayer ceramic capacitor according to claim 1, wherein the thin portion has a curved shape.

16. The multilayer ceramic capacitor according to claim 1, wherein the thick portion has a curved shape.

17. The multilayer ceramic capacitor according to claim 1, wherein a maximum thickness of the thickness portion is about twice a thickness of the opposing portion.

18. The multilayer ceramic capacitor according to claim 1, wherein at least one surface of the thick portion extends parallel or substantially parallel to the length direction.

* * * * *